United States Patent [19]

Van Dusen

[11] 4,242,028
[45] Dec. 30, 1980

[54] RING TYPE SILO UNLOADER

[75] Inventor: Frederick E. Van Dusen, Hopkins, Minn.

[73] Assignee: Van Dusen & Co., Inc., Plymouth, Minn.

[21] Appl. No.: 3,198

[22] Filed: Jan. 15, 1979

Related U.S. Application Data

[63] Continuation of Ser. No. 815,649, Jul. 14, 1977, abandoned.

[51] Int. Cl.³ ............................................. B65G 65/38
[52] U.S. Cl. .................................................... 414/320
[58] Field of Search ................................ 414/313–321; 406/114; 52/65, 224, 247, 248; 222/404, 405

[56] References Cited

U.S. PATENT DOCUMENTS

| | | | |
|---|---|---|---|
| 1,151,870 | 8/1915 | Galbraith | 52/248 X |
| 3,146,899 | 9/1964 | Bruecker | 414/318 |
| 3,368,703 | 2/1968 | Lusk | 414/297 |

Primary Examiner—Robert G. Sheridan
Attorney, Agent, or Firm—Kinney, Lange, Braddock, Westman and Fairbairn

[57] ABSTRACT

The present invention relates to a silo unloader which has a center ring supported through a support framework from a single centrally located cable, and a silo unloader is mounted for rotation relative to the ring. The ring is held from rotation through the use of a torque arm, and the unloader is driven for rotation by the same motor which powers the other standard silo unloader components. A chain encompasses the support ring and the drive sprocket and motor orbits around the ring with the silo unloader, which moves in a circular path for gathering and unloading silage through conventional means. The assembly can be suspended at the top of silos in which it is used.

29 Claims, 8 Drawing Figures

RING TYPE SILO UNLOADER

This is a continuation of application Ser. No. 815,649, filed July 14, 1977, now abandoned.

BACKGROUND OF THE INVENTION

1. Field of the Invention

The present invention relates to ring type supports and drives for silo unloaders.

2. Prior Art

Silo unloaders which utilize a support ring mounted in the silo have been known in the prior art. In most of these, some type of a drive wheel that engages the ring is used either a gear or toothed wheel, or a friction wheel. U.S. Pat. No. 3,912,090 illustrates a support ring that is suspended in the silo, and an unloader is supported on rollers relative to the ring. The unloader is driven through the use of a sprocket type drive wheel as shown in FIG. 6 of this patent. Problems which can occur with this type of drive are quite obvious, in that the ring will tend to deflect, and the drive sprocket may slip, and also the cost of forming the ring with holes punched through it for the drive wheel is quite high.

Another type of support ring is shown in U.S. Pat. No. 2,678,241 which illustrates a ring that has a silo unloader supported on rollers, but wherein the drive for the silo unloader is through the use of a wheel that engages the surface of the silage being unloaded.

Another type of ring type silo unloader wherein the silo unloader is driven through a chain arrangement with the drive motor staying stationary to rotate the gathering mechanism is shown in U.S. Pat. No. 2,580,306 issued to Leach et al. In this device, it can be seen that the drive will be subjected to relatively high loads because the direct drive to the rotating mechanism is from a relatively small diameter drive sprocket. The chain tension necessary for rotating the unit is therefore also quite high.

A silo unloader which has a support ring that is supported from a single cable, and has an upper framework attached to the ring is shown in U.S. Pat. No. 3,146,899. In this device, a friction drive wheel is used against the ring, and friction drives in a silo environment cause a good bit of problem.

Similar devices that show the state of the art include U.S. Pat. No. 3,368,703 which shows a toothed drive, and support rollers on a centrally supported large diameter ring which is suspended from a plurality of cables. A friction drive ring is shown in U.S. Pat. No. 3,612,617, and a typical center unloading silo unloader which can be also used for leveling and filling is shown in U.S. Pat. No. 3,075,657. Other examples of prior art silo drives include the patent to Cordis, U.S. Pat. No. 2,445,056, which illustrates a chain type drive for a silo unloader wherein the chain again directly drives from a stationary motor to rotate the silo unloader.

U.S. Pat. No. 2,963,327 also shows a device having a center ring supported from cables using a toothed drive wheel, as does U.S. Pat. No. 3,473,677. In U.S. Pat. No. 2,701,652 a support ring which has toothed sockets on its top flange is shown. The drive sprocket therefore rotates about a horizontal axis for driving.

SUMMARY OF THE INVENTION

The present invention relates to a ring type silo unloader wherein the support ring is a channel shaped cross section member, and the silo unloader rotates relative to the ring. The ring is suspended at one central suspension cable during use and has a framework extending from the ring up to a center point on which a pulley used with a suspension cable is mounted. The ring is held from rotation relative to the silo through the use of conventional torque arm that telescopes relative to the side walls of the silo, but which will permit the ring to move radially relative to the silo walls slightly.

The rotating silo unloader assembly is supported on the ring for rotation, and is driven relative to the ring through the use of a driving sprocket mounted on the silage gathering frame of the unloader (the drive sprocket rotates with the silo unloader) which drives itself around the ring through a chain which is wrapped around the ring and guided in a suitable channel member. In other words, the drive sprocket orbits the ring, and while the ring doesn't rotate, the chain on the ring will lift away from the ring to permit the sprocket to orbit or drive around the ring and thereby rotationally drive the silo unloader. Because the drive sprocket is spaced outwardly from the axis of rotation a substantial distance (it is outside the ring) excessive loads are not encountered during normal operation of the silo unloader when rotating it about the silo and about the ring.

The ring is chordally braced with suitable compression braces, certain ones of which may be moved out of their normal position to permit filling through the ring. The struts or braces that extend above the ring toward the center carry both tension and compression load and are spaced apart to form an open framework. There is sufficient space between adjacent braces so that filling of the silo may be accomplished where a center diverter is used and an auxiliary hoisting pulley offset from the central axis of the ring is provided to suspend the ring and silo unloader to one side for wall clearance when raising the unloader for filling.

The main ring is made with upper and lower flanges, and an insert channel is used in the ring. The insert channel has an upper flange that cooperates with the upper flange of the main ring to define a channel for the drive chain. The lower flange of the insert channel rests on the lower flange of the main channel, and rollers which support the silo unloader ride on the lower flange of the insert channel. The insert channel is made so that it can be inverted, so that if the lower flange on which the support rollers ride tends to wear, the insert can be placed upside down and the previous upper flange of the insert will be used as the support surface for the support rollers.

The ring and insert channel are made in suitable sections that can be easily formed and rolled, and then assembled to form the continuous ring. Because an external chain is utilized, the ring does not have to be made to as close tolerances as it does when a drive sprocket or friction drive wheel is used in engagement with the ring, and some variations in size can be accommodated. The drive is relatively low cost, and does not require excessive forces or torques for driving.

The silo wall guide wheels for the silo unloader are mounted on folding arms so that the wheels can be folded upwardly when the silo unloader is raised for filling oerations to permit the silo unloader assembly to be raised into the dome of the silo, and also to be offset from the center line of the silo for filling.

Additionally, the torque arm assembly which normally keeps the ring structure from rotating during unloading operations is provided with two mounting locations, one of which will permit the rotation of the silo unloader to a position wherein a selected space between the diagonal braces and the other braces for the ring can be directed toward the input chute or spout of a silo filler, to permit the silo to be filled through the ring and across a deflector or distributor that may be mounted on the silo unloader if desired. The torque arm will hold the silo unloader in a desired position during this filling operation. As stated the chordal ring braces can be made to permit moving the certain braces out of the wa to provide clearance through the ring for filling.

BRIEF DESCRIPTION OF THE DRAWINGS

FIGS. 7 and 8 are detail exterior and interior views respectively of the splice used for the support ring.

DESCRIPTION OF THE PREFERRED EMBODIMENTS

Figure 1:
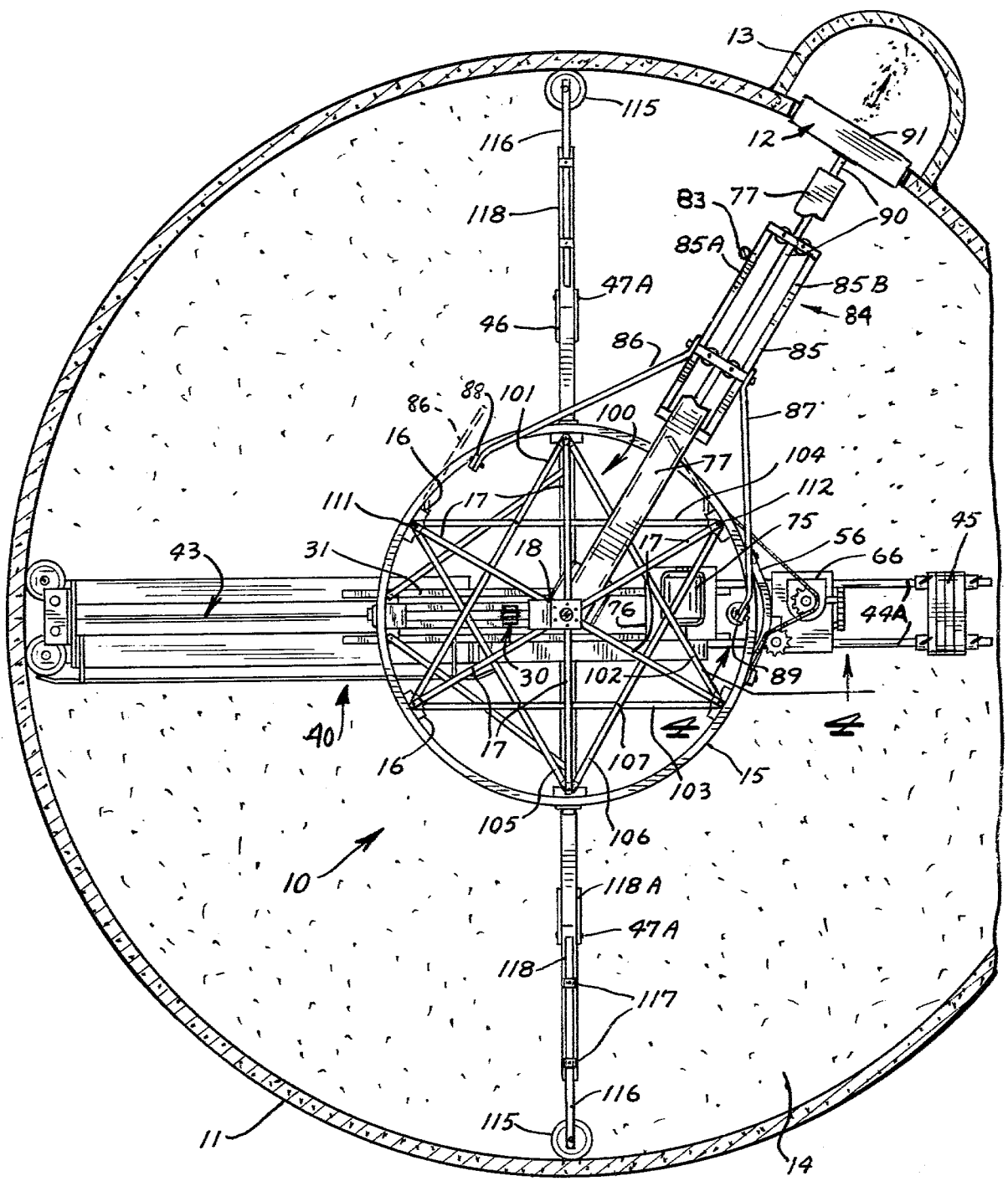
FIG. 1 is a top plan view of a silo having an unloader assembly made according to the present invention installed thereon.
Figure 2:
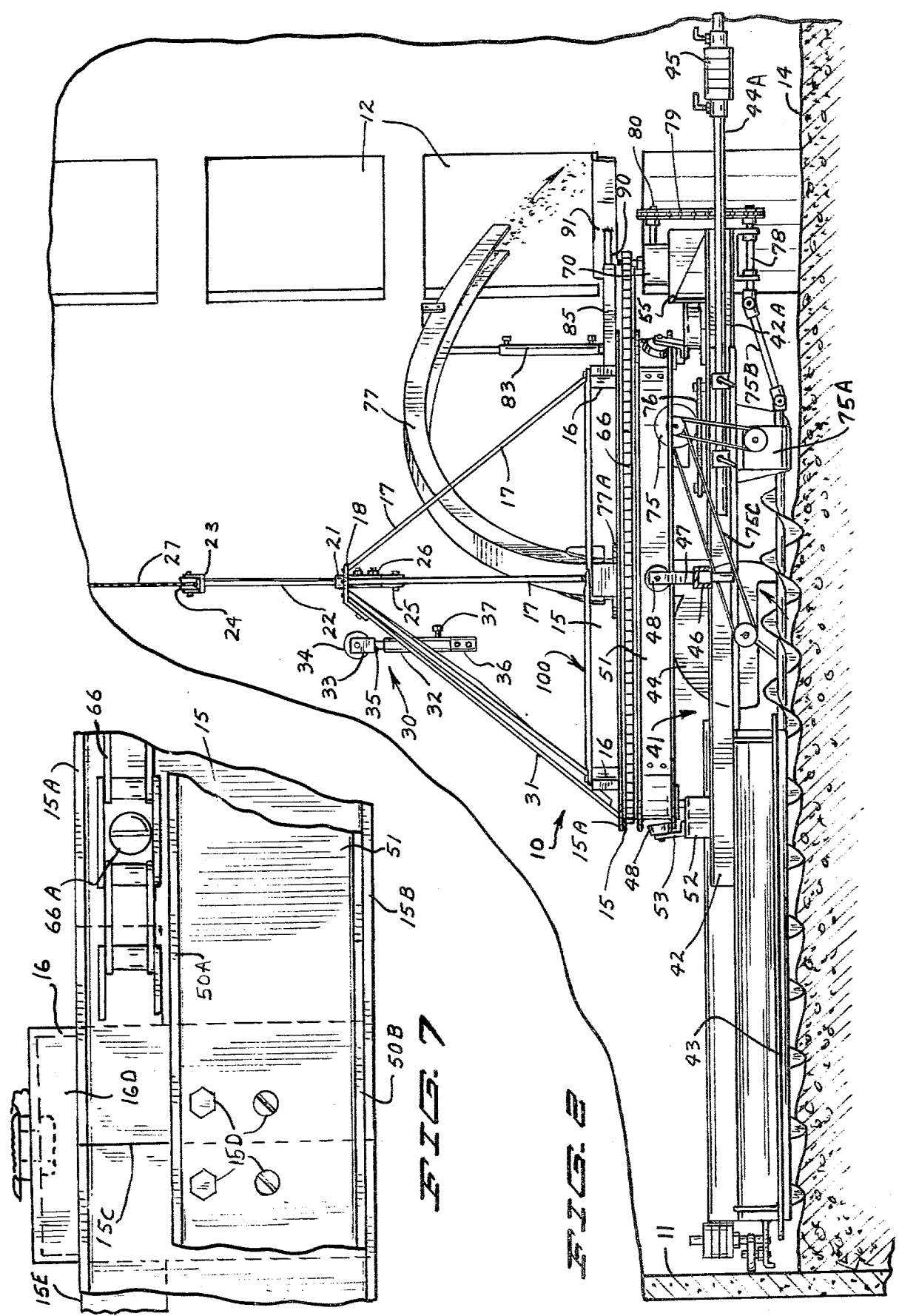
FIG. 2 is a side elevational view of the device of FIG. 1.

Referring primarily to FIGS. 1 and 2 for a general orientation, the silo unloader assembly illustrated generally at 10 is mounted in an upright silo having an annular wall 11 of conventional design, and as shown the silo 11 has openings 12.

The silo chute 13 is provided in the normal manner and extends past the door openings 12. As shown, the silo has silage indicated at 14 therein.

The silo unloader assembly 10 includes a support ring 15 of substantial diameter that forms the main support member for the silage gathering augers, and blower and drive motor. The ring 15 has evenly spaced uprightly extending members 16 around the periphery thereof (there are six around the periphery). Each of these members supports an upwardly inclined brace 17 which is attached to its respective upright member 16. Thus there are six braces, and each of them is fastened to a member 16, and extends upwardly and inwardly toward the central axis of the ring 15. This can perhaps best be seen in FIGS. 1 and 2. At the upper ends of the braces 17 there is a central mounting plate 18 to which each of the braces 17 is secured. The braces 17 are attached through bolts or other suitable fasteners, to provide an overhead framework that meets at the center. The plate 18 has a sleeve indicated at 21 fixedly mounted thereon that is coaxial with respect to the ring 15. The sleeve 21 in turn slidably carries a tube 22. The upper end of the tube 22 has a yoke 23 in which a pulley 24 is rotatably mounted. The tube 22 extends through the sleeve 21, and is axially retained relative to the sleeve 21 with compression collars 25 at the lower end of the tube which are held in place with suitable pins. The rotational position of the tube 22 relative to the sleeve 21 is controlled through the use of set screws 26 threaded in wall of sleeve 21 so that the axis of rotation of the pulley 24 can be held in any desired angular position relative to the sleeve 21.

A suspension cable 27 has one end fixed to a normal upper silo tripod which mounts on the upper edges of the silo walls. The cable is reeved over pully 24 and returns to a winch which is used for controlling upward and downward movement of the silo unloader through cable 27. The tripod is of conventional design normally used for silo unloaders, and the winch mechanism can be any desired type of design as well.

During filling the silo, the unloader can be supported through an auxiliary support pulley assembly which is illustrated at 30. This auxiliary pulley assembly is mounted onto a support brace 31 which is secured to the ring 15 and is also secured to the plate 18. The brace 31 is formed by two spaced apart members as shown, and between these two members there is a sleeve 32 secured in position parallel to the sleeve 21 and of the same size as sleeve 21, but offset from the center of the ring 15 as shown. The sleeve 32 is used for mounting a yoke 33 having a pulley 34 rotatably mounted therein. The yoke 33 is mounted onto a tube 35 which extends through sleeve 32, and is held axially with a collar 36 at the lower end of the tube 35. Suitable set screws 37 in the wall of sleeve 32 also are used for securing the tube 35 in its desired rotational position for use. The tube 22 and attached pulley may be used in sleeve 32 rather than having a completely separate assembly.

Pulley 34 is utilized with a cable for lifting the silo unloader during filling operations where an offset of the unloader from the center line is necessary to move the unloader away from the silo wall for clearance when hoisting the unloader.

The ring 15 is used to support a rotating silo gathering and discharging mechanism (the operational silo unloader portion) illustrated generally at 40. The unloader portion that rotates relative to ring 15 comprises a subframe 41 which includes main auger frame members 42 that are of conventional design, and which extend laterally above an auger assembly 43 which is used for gathering the silage in from the outer portions of the silo. The augers move the silage inwardly toward the discharge impeller 44, which is of conventional design. The impeller 44 is also carried directly on the frame members 42. Suitable counterweight support members 44A extend in an opposite direction from the auger assemblies 43 to support a counterweight 45 which is adjustable along the length of the counterweight support members. The counterweight support members are mounted on and rotate with the subframe.

Cross frame members indicated generally at 46 are also provided, and each of these frame members carries a support roller that rotationally mounts and supports subframe assembly 41 with respect to the ring 15. The cross members 46 as shown have upright posts 47 (see FIG. 2) on which part conical surface rollers 48 are rotatably mounted. The rollers 48 are cut so that the side surfaces engage the lower flange 50B of a roller track insert channel 51. The frame members 42 carry a support 52 which extends between the members 42 on an opposite side of the ring from the counterweights. The support 52 has an upright member 53 thereon (FIG. 2) and the upright member 53 also supports a roller 48 as shown for rotatable movement along the flange 50B of the roller track insert channel 51.

The ring 15 as shown is a channel shape, having outwardly extending flanges 15A and 15B at the upper and lower edges thereof. The roller track insert 51 is also a channel shaped member and has the flange 50B at the lower edge, and a flange 50A at its upper edge. The channel shaped member 51 is curved to conform to ring 15, and is fastened to the ring 15 on the outer surface thereof in a suitable manner such as through the use of bolts. The ring 15 is made into individual part annular sections that are fastened together with suitable splicing plates or other means for joining it into the complete ring structure as will be explained in connection with FIGS. 7 and 8. The track insert channel has sections too, but they span the splices of ring 15 and are bolted in place on the ring.

The frame members 42 extend outwardly beyond the ring 15 and a support member 55 is attached on the opposite side of the ring from support 52. An elongated, part annularly extending rail 56 is mounted to the support 55. The rail extends laterally from the members 42 and is on the outside of the ring 15. The opposite ends of the rail 56 each have an upright member 56A supporting a roller 48 which engage the flange 50B of the insert channel 51.

A flanged guide roller indicated generally at 60 is used on the interior of the ring adjacent to the support rollers 48. The guide rollers 60 are rotatably mounted about a vertical axis, and have a lower flange 62 (see FIG. 4) which rides under the lower edge of the ring 15, and the rollers have an inner center column 63 that rides on the inside of the ring 15. Thus the backing of guide rollers 60 support the ring 15 and insure that the outer rollers 48, which support the silo unloader assembly relative to the ring do not slip out of the lower flange 50B of the track insert channel 51. Adjacent rail 56, one roller 60 is used and is positioned midway between the ends of the rail.

The track insert channel 51 is positioned on the ring 15, so that the upper flange 50A is spaced from and below the upper flange 15A of the ring 15. The flanges 15A and 50A define a track into which a suitable link chain indicated at 66 can be placed. The chain 66 surrounds the ring 15 as shown and is used as a drive connection.

Figure 4:
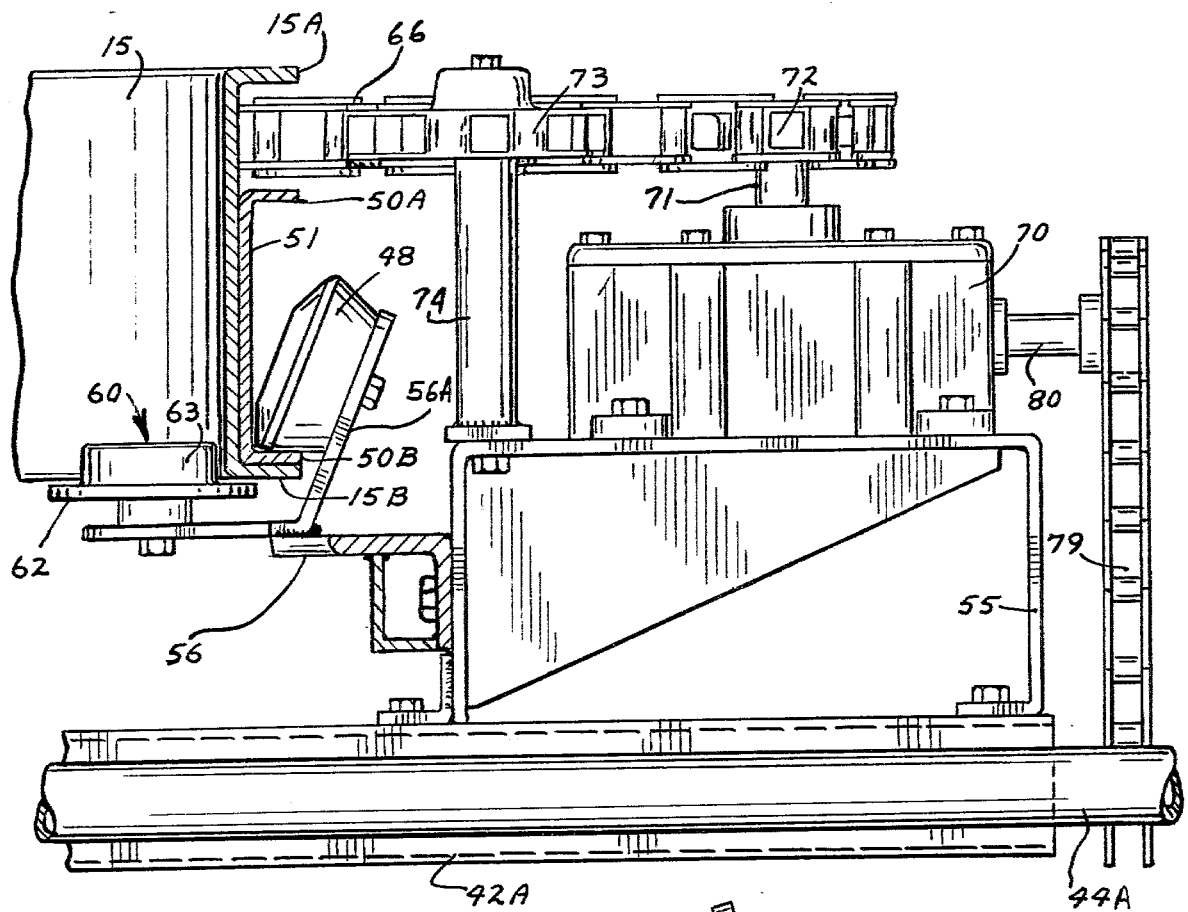
FIG. 4 is a sectional view taken as on line 4—4 in FIG. 1.
Figure 5:
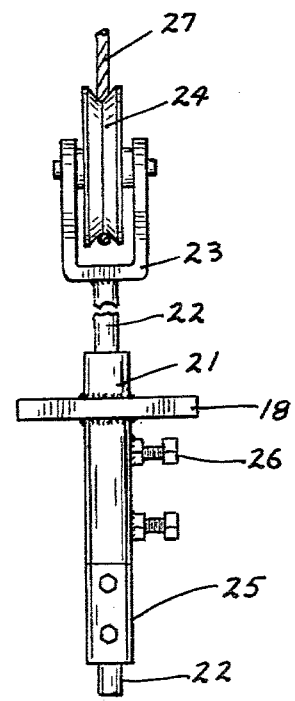
FIG. 5 is a enlarged sectional view showing the details of mounting of a pulley member used for cable suspension.

The support 55, which is shown perhaps best in FIG. 4 also, mounts a suitable gear box such as a worm gear box indicated at 70, and the output shaft of the gear box indicated at 71 has a sprocket 72 mounted thereon. Sprocket 72 drivably engages the chain 66 as shown. A suitable chain idler sprocket 73 is mounted onto an upright support 74 that is also attached to the support 55, and because the entire silo unloader assembly including the frame members 42, and the supports 46 as well as the members carried thereby are mounted as a unit and are free to rotate relative to the ring 15, power rotation can be accomplished by driving sprocket 72 so that it will drive through the chain 66 and will orbit around the ring 15 as it drives.

The power is provided by an electric motor 75 which is mounted onto a support 76, also carried by the frame members 42 so that the motor rotates with the augers 43 and frame members 42 and 46. Electric power is transmitted to the motor through a suitable slip ring assembly in the center of the ring 15 which operates through a swivel leading from the blower or impeller housing to a discharge gooseneck 77 in a normal manner. The slip ring assemblies are conventionally used in silo unloaders. The motor 75 in turn drives through suitable drive connections to rotate a shaft 78, which in turn drives a chain 79 that drives the input shaft 80 of the gear box 70. The shaft 78 is driven through a universal joint drive shaft 75B from a gear box 75A located underneath the motor 75. The gear box 75A under the motor 75 also is used for powering the silage gathering augers in a conventional manner. The blower is driven from motor 75 through a suitable drive connection 75C.

Thus, the entire assembly supported from the ring 15 will rotate while supported and guided on the rollers 48 and the unloader will gather silage in the normal manner, bring it into the blower or impeller and it will be discharged from the blower through the gooseneck 77 and out through the openings 12. It can be noted in FIG. 1 that the gooseneck 77 is supported on an upright support 83 which is mounted on a torque arm assembly that is shown at 84.

The tendency of the ring 15 to distort from a true circle during use is resisted by the use of the extra insert channel 51 forming the roller track, so the ring is strengthened. The insert track sections 51 can be inverted if the lower flanges of the insert shown at 50B wears.

The ring 15 is kept from rotating by the torque arm assembly 84 just previously mentioned. This torque arm assembly is directly underneath the gooseneck 77, and includes an exterior frame assembly 85 which comprises two members 85A and 85B that are spaced apart and extend parallel to each other. The members 85A and 85B are held together with suitable cross members and the assembly is fastened to a pair of diverging arms 86 and 87, which in turn are pivotally mounted to pivot pins 88 and 89, respectively, which are fastened to upright supports fixed to the ring 15. The upright supports can be any type desired, and the pivot pins 88 and 89 receive the ends of the arms 86 and 87 and pivotally mount the arms for movement about a generally horizontal axis.

The frame members 85A and 85B in turn are used for supporting a telescoping rod 90 which is mounted and guided by suitable rollers on the cross members holding the members 85A and 85B together so that the rod 90 can telescope in and out in a radial direction relative to the silo. The telescoping rod or arm member 90 has a bracket 91 thereon at the outer end which fits over the edge of the silo wall at the lower end of the silo door opening 12 and can be clamped relative to the silo wall. Then it can be seen that the framework 85 acting through arms 86 and 87 and the arm 90 will resist rotational movement of the ring 15 on which they are mounted and hold the ring and unloader in proper position for operation during silo unloading.

As the silage is removed, the clamp 91 would also be moved down to the next lower door 12 in a normal manner.

The ring 15 is also internally braced against distortion through the use of chordal braces that extend between the upright members 16 to which the braces 17 are attached. These chordal braces are indicated generally at 100, and as can be seen, each of the braces extends across a 60 degree chord so that three of the braces 100 form a triangle. For sake of explanation, the three braces 101, 102 and 103 form a triangle and three braces 104, 105 and 106 also form a different triangle. Where the braces cross, they may be fastened with suitable bolts 107 to obtain a very rigid bracing structure. The braces are attached to the upright members 16 with a common bolt which attaches the upwardly extending braces 17 to the member 16 as well.

Figure 3:
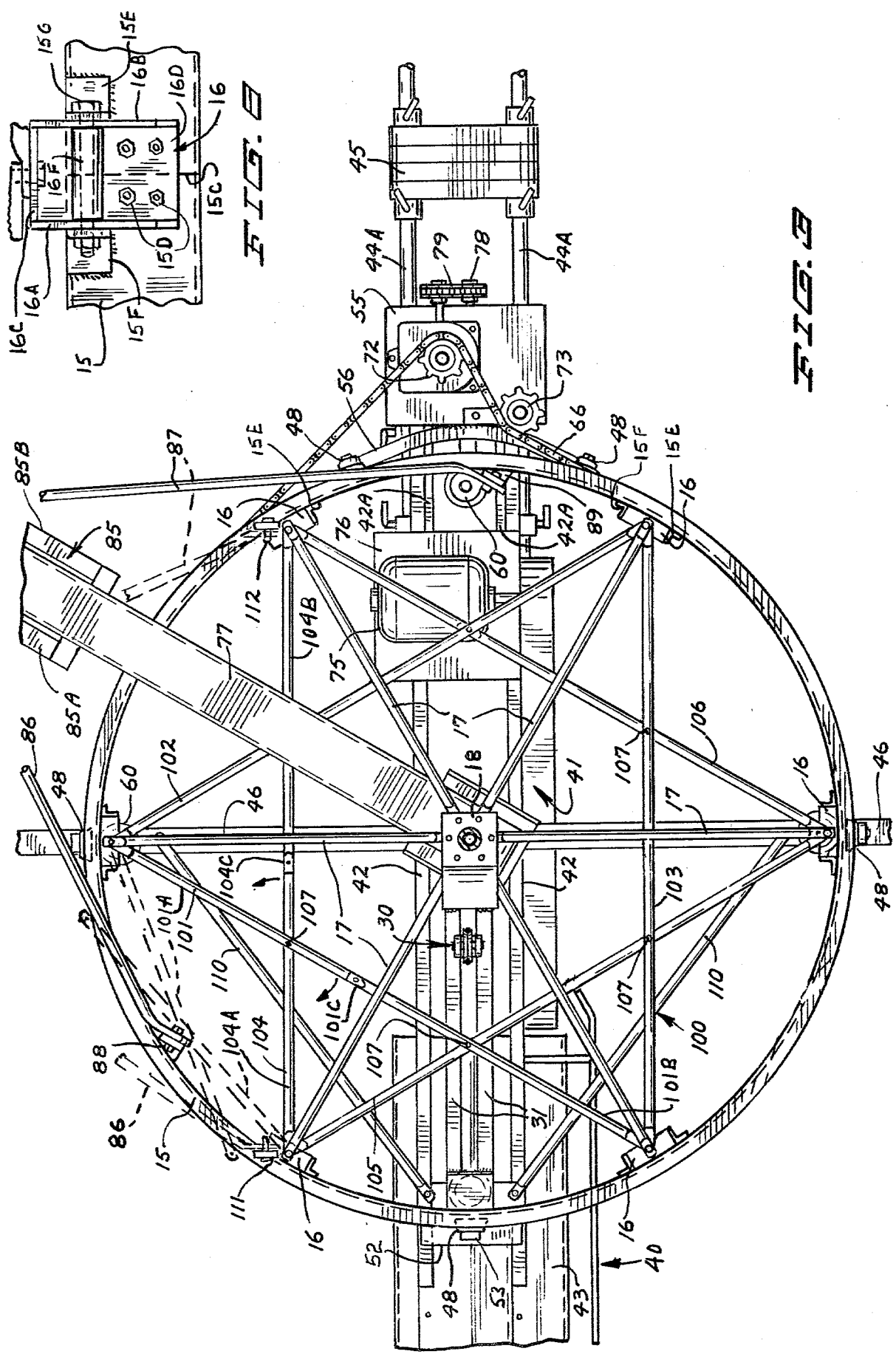
FIG. 3 is a top plan view of the ring structure of enlarged scale from that shown in FIG. 1.

If desired, the frame members 46 can also be braced to the frame members 42 with suitable braces 110, as shown in FIG. 3. Braces 110 rotate with the silo unloader assembly around the ring 15, while the braces that are indicated generally at 100 do not rotate but stay stationary with and brace the ring.

In order to open a space through the braces 100 for filling silage, particularly where a deflector might be mounted on the unloader itself, the braces 101 and 104 are split into sections. For example brace 101 is split into sections 101A and 101B (FIG. 3) and brace 104 is split into sections 104A and 104B as well. These sections, 101A and 101B, and 104A and 104B, respectively, are joined together with a suitable bolt or cap screw so that they each act as a rigid brace, but the sections can be disconnected at their junction points indicated at 101C and 104C, respectively. Then the junction bolt 107 between the sections 101A and 104A can be removed and the brace portions 101A and 104A moved to their dotted line positions of FIG. 3 so that the space in this section of the ring 15 is unobstructed.

In order to properly orient the ring 15, the torque arm can be removed from its pivots 88 and 89 and mounted onto separate pivot pins indicated at 111 and 112 which are rotationally offset from the pins 88 and 89, and thus when the torque arm 84 is fastened adjacent a door and is supported on pins 111 and 112, the quadrant left open by movement of the braces 101A and 104A is properly aligned with respect to the doors. In this manner, the silo can be filled with the silage passing through the open portions of the ring.

The frame members 46 as shown extend outwardly from the ring 15 and have wall wheel assemblies indicated at 115 attached thereto (see FIG. 1). The wall wheel assemblies are mounted onto telescoping arms 116 which are slidably, adjustably mounted relative to brackets 117 on an arm member 118. The arms have a fixed length when in use. The arms 118 each include a bifurcated inner end portion indicated at 118A.

The side members of the bifurcation 118A straddle the end of the respective member 46, as shown in FIG. 1 and a pivot pin 47A is provided to mount the arm member 118 to the brace 46. The arm members 118 can thus be pivoted upwardly and tilted back over the ring 15 and silo unloader assembly to reduce the width of the wall wheels and permit the silo unloader to be lifted further upwardly into the dome or roof of a silo underneath the tripod and in this way be lifted completely clear of many filling spouts so that the unloader won't interfere with filling.

The pulley 34 may be utilized for lifting the silo unloader and permits offsetting the central axis of the ring relative to the central axis of the silo for clearance.

Figure 6:
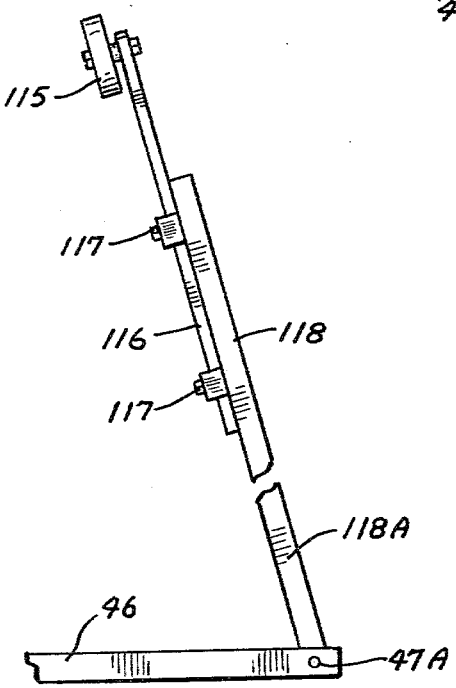
FIG. 6 is a side view of a wall wheel and support arm in folded position.

The folding action relative to brace 46 is shown in FIG. 6, and it can be seen that this will reduce the effective diameter substantially.

The supports for the counterweight also can be telescoped inwardly a substantial distance so that these weights 45 will be very close to the support 55 and reduce the overall size of the assembly.

The channel inserts 51, as stated, can be inverted (switched end for end) so that the rollers 48 will run on flanges 50A rather than 50B. FIGS. 7 and 8 illustrate a typical splice for the section of the ring 15. The ends of the sections of the insert channel 51 are offset from the splice line 15C so the insert channel 51 overlaps the splice and aids in providing rigidity.

The upright members 16 which are used for attaching struts 17 and also the chordal braces, are used as a splice backing member. The member 16 is a channel having legs 16A and 16B which extend inwardly from ring 15. A top cross member 16C is welded to legs 16A and 16B and the struts 17 and the chordal braces are bolted to the cross member 16C.

The base wall 16D of channel 16 is placed to overlap splice line 15C and is bolted with bolts 15D, which pass through the insert channel section 51 and through base wall 16D.

To resist tendencies of the splice to separate adjacent the top flange 15A of the ring section, a pair of clips 15E and 15F are welded to the ring section adjacent the ends of each ring section and the channel 16 fits between the clips. A bolt 15G passed through the clips, through the legs 16A and 16B, and through a spacer 16F positioned between legs 16A and 16B. The bolt is tightened securely and resists any tendency of the splice 15C to separate as the silo unloader rotates. The suspension points are at the splice lines, as shown.

The splices thus are rigid and the channels 16 transfer loads to the struts 17, which support the ring.

The struts 17, it should be noted carry compression, as well as tension. Thus when the unloader is working and rotates around the ring, the struts 17 will resist in compression any tendency of the ring to distort or move upwardly, thereby increasing the ring rigidity greatly as compared to an arrangement using a cable suspension for an unloader support ring.

The ring 15 can move relative to the wall of the silo during use and orbits as the auger rotates. The suspension permits this orbit movement and the struts 17 carry both tension and compression during such movement. The chain 66 may be replaced with a suitable cogged belt or other endless flexible drive member. An orbiting wheel like member such as a pully or sheave would be used in place of sprocket 72 in such a case.

A pair of studs 66A which have heads as shown in FIG. 7 are spaced at suitable positions on the ring 15. The heads of the studs 66A form driving lugs for the chain to prevent slippage. The studs 66A are positioned so that at least one stud is engaging the chain at all times even when the chain is lifted away from the ring as sprocket 72 passed by. These studs act similarly to cogs on a sprocket for chain drive.

For safety to protect the chain 66 and the other drive components the sprocket 72 is driven through a shear pin that connects two parts of the sprocket hub together.

What is claimed is:

1. A silo unloader for use in an upright wall silo comprising an annular ring track means mounted within said silo, a silage gathering and discharge device, track engaging means to guide such silage gathering and discharge device for rotation relative to said track means while in engagement with silage in the silo, means to restrain said ring track means from rotation within said silo, and drive means to drive said silage gathering and discharge device rotationally around said track means, comprising power means mounted on said silage gathering and discharge device, an endless flexible member surrounding the outer surface of said ring track means, said power means including a rotationally driven member for engaging said endless flexible member, said rotationally driven member being positioned on the outside of said ring track means and driving said silage gathering and discharge device and said driven member around said ring track means.

2. The combination as specified in claim 1 wherein said rotationally driven member comprises a sprocket, and said endless flexible member comprises a chain, said chain encircling said ring track means and said sprocket.

3. The silo unloader assembly of claim 1 wherein said track engaging means comprises a plurality of rollers mounted with respect to said silage gathering and discharge device and rotatably engaging portions of said ring track means to support and guide said silage gathering and discharge device.

4. The combination as specified in claim 1 wherein said silage gathering and discharge device comprises a frame that extends outwardly beyond said ring track means in opposite diametral directions, and includes silage gathering auger means extending outwardly beyond the ring track means in a generally radial direction.

5. The combination as specified in claim 4 wherein said frame extends in opposite direction from said auger means, said rotationally driven member being positioned on the side of said ring track means opposite from said auger means.

6. A silo unloader for use in an upright wall silo comprising an annular ring track mounted within said silo, a silage gathering and discharge device, track engaging means to guide such silage gathering and discharge device for rotation relative to said track while in engagement with silage in the silo and drive means acting between the track and the silage gathering and discharge device to drive the silage gathering and discharge device rotationally around said track said track being of smaller diameter than the silo and being movable transversely to the wall during use, means to support said track comprising a plurality of elongated members attached to said track at annularly spaced locations adjacent the peripheral edges thereof and extending upwardly and inwardly toward a central axis of said track, means to support the upper ends of the elongated members at a position spaced above the plane of said track to thereby provide suspension for the track, a plurality of chordal brace means, each connected to said track and extending in chordal relation to said track, each brace means having its opposite ends fixed to said track at spaced locations to form internal braces resisting radial deformation of said track.

7. The combination as specified in claim 6 wherein at least one brace means is formed into two sections generally midway between the ends of the brace means where it is connected to said track, means to releasably secure said sections together in mid portion of said brace means, said means to releasably secure and the mounting of said ends of the brace means relative to said track permitting the sections of said brace means and the mid portions thereof to be swung relative to the track until the mid portion of the brace means are substantially clear of the interior of said track.

8. The combination as specified in claim 6 wherein there are six brace means and each brace means extends across substantially a 120 degree chord of said track, said brace means thereby forming the legs of two triangles and being positioned with the apexes of the two triangles substantially 60 degrees apart so that the legs of each triangle overlap the legs of the other triangle.

9. A silo unloader assembly for use in an upright wall silo comprising a support ring, a silage gathering and discharge device rotatably mounted on said support ring, power means to rotate said silage gathering and discharge device relative to said support ring, means to restrain said support ring from rotation relative to said silo wall, first means to releasably connect said means to restrain said support ring from rotation to said support ring with said support ring held in a first position with a desired annular sector of said support ring in a first annular sector of said silo, and second means to releasably connect to said support ring said means to restrain said support ring from rotation to said support ring with said support ring held in a second position with said desired annular sector of said support ring in a second annular sector of said silo.

10. The combination as specified in claim 9 wherein said silage gathering and discharge device comprises a frame member, said frame member extending generally radially of said support ring and below said ring and extending out beyond the periphery thereof, auguer means mounted on said frame member and being rotatably driveable to gather silage and move silage toward the center portions of said support ring, and a pair of silo wall engaging wheel means extending radially from said frame and having axes of rotation generally perpendicular to the longitudinal axis of said auger means.

11. The combination as specified in claim 10 wherein said wall engaging wheel means are mounted on radial extended arm means, and pivot means to permit said arm means to fold about an axis spaced a desired distance outside the periphery of the support ring whereby said wall engaging wheel means can be pivoted upwardly toward the central axis of said support ring so that the wall engaging wheel means are reduced in radial extension a substantial amount.

12. The combination as specified in claim 9 wherein said power means comprises a motor mounted on said silage gathering and discharge device, a flexible endless drive member surrounding and engaging said support ring and being generally in non-slipping engagement with said support ring, a wheel like member driven by said power means and positioned on the interior of said flexible endless drive member to driving engagement therewith but being spaced from the periphery of said support ring so that the flexible endless drive member encompasses the support ring and wheel like member, the wheel like member engages said flexible endless drive member and pulls the silage gathering and discharge device rotatably around said ring.

13. A silo unloader assembly for use in a silo comprising an annular, generally circular support ring having a central generally upright axis, a silage gathering and discharge device mounted on said support ring for rotation about said central axis while supported on said support ring, power means mounted on said silage gathering and discharge means to rotate said silage gathering and discharge device relative to said support ring while it is in engagement with silage in the silo, means to restrain said support ring from rotation relative to said silo wall, an endless flexible drive member surrounding and drivably engaging a wheel like member driven by said power means about an axis generally parallel to said central axis and positioned on the exterior of said support ring and spaced from said support ring, said endless flexible member encompassing said wheel like member and said support ring and being in drive engagement with said wheel like member whereby when said wheel like member is rotated it drives itself and the silage gathering and discharge device around the support ring.

14. The unloader assembly of claim 13 wherein said endless flexible member is a link chain, and said wheel like member comprises a sprocket.

15. The combination as specified in claim 13 wherein said support ring comprises a channel-shaped member having a base wall generally parallel to the central axis and a lower flange extending generally horizontally from the base wall, and roller means for supporting said silage gathering and discharge means, said roller means riding against the upper surface of said lower flange.

16. The combination as specified in claim 13 wherein said support ring is made up of a plurality to individual part annular segments of a circle, and means joining said individual segments together to form said support ring into a continuous circle.

17. The combination as specified in claim 13 wherein said support ring includes a main channel and an insert channel, said main channel comprising a base wall generally parallel to said central axis and have upper and lower outwardly extending flanges, said insert channel being mounted in said main channel, the insert channel comprising a channel having an insert base wall that extends generally parallel to the base wall of said main channel and having insert flanges extending outwardly from said insert base wall, a lower insert flange being mounted to be contiguous to and above the lower flange of said main channel, roller means for mounting said silage gathering and discharge device relative to said ring, said roller means engaging the upper surface of the lower flange of the insert channel.

18. The combination as specified in claim 17 wherein said insert channel is made into part circular segments, each of said segments including means to attach the insert channel to the main channel, said insert channel segments being switchable end for end whereby the previous upper insert channel flange forms the lower insert flange and then comprises the flange engaged by the roller means when the insert channel has been switched end for end.

19. The combination as specified in claim 17 wherein the said insert channel is of size to be positioned within the flanges of the main channel, and the upper insert flange of said insert channel and the upper flange of the main channel being spaced and forming guide flanges for said endless flexible member.

20. The combination as specified in claim 19 wherein the endless flexible member comprises a chain, and wherein said wheel like member comprises a sprocket drivably engagable with said chain.

21. The combination as specified in claim 20 wherein said power means further comprises a motor mounted on said silage gathering and discharge device and movable therewith.

22. The combination of claim 16 wherein said means joining said individual segments comprises a bolt means having an axis generally parallel to the plane of the ring and positioned adjacent the upper portion of the ring, and clip means adjacent the end of each segment, said bolt means holding the clip means on the two adjacent ends where the segments join under tension load.

23. The combination of claim 22 and means to support said ring comprising a framework including a plurality of struts capable of carrying tension and compression loads attached to said ring at each of the junctions between segments of said ring extending away from the plane of the ring and inwardly toward said central axis, and means to fixedly connect all of said struts together adjacent said central axis of the ring at position spaced from the plane of said ring.

24. The combination of claim 23 wherein said clip means adjacent the ends of adjacent segments are spaced apart when the adjacent segments are in position forming a ring, a support positioned between said clip means, said bolt means passing through said clip means also holding said support, said struts being attached to the respective supports.

25. The combination as specified in claim 24 wherein each of said supports in a channel, having a base wall and legs, said legs of each channel being contiguous with the clip means where two segments join and said base wall being bolted to the segments to hold joining segments together.

26. A silo unloader assembly for use in an upright silo having an annular wall including an annular ring like track having a track central axis, means to support said track comprising a framework including a plurality of more than two struts having tension and compression load carrying capabilities attached to said track at annularly spaced locations adjacent the peripheral edges thereof and extending upwardly and inwardly toward a central axis of said track, means to fixedly connect all of said struts together adjacent the central axis of the track at a position spaced above the plane of said track comprising plate means, a sleeve mounted on said plate means, said sleeve having an axis substantially coaxial with said track central axis, cable support means including a portion rotatably mounted within said sleeve and secured from axial movement out of said sleeve in upward direction, cable means for adjustably supporting said track relative to a silo through said cable support means, and releasable means acting between said sleeve and the cable support means to prevent rotation of said cable support means relative to the axis of said sleeve during use.

27. The combination as specified in claim 26 and second means on said unloader assembly offset from the track central axis to mount a cable support means from the central axis of said track.

28. The combination as specified in claim 6 wherein there are at least three chordal brace means and each chordal brace means extends across substantially a 120 degree chord of said track.

29. The silo unloader assembly of claim 1 and at least three chordal brace means connected to said ring track means and extending in chordal relation to said ring track means and being fixed to said ring track means at their opposite ends to form internal braces resisting deformation of said ring track means in the plane of the track.

* * * * *